United States Patent [19]

Hirano et al.

[11] 4,156,281

[45] May 22, 1979

[54] ELECTRONIC INSTRUMENT

[75] Inventors: Reiji Hirano, Yokohama; Ichiro Sado, Tokyo; Seiji Saito, Yokohama, all of Japan

[73] Assignee: Canon Kabushiki Kaisha, Tokyo, Japan

[21] Appl. No.: 843,677

[22] Filed: Oct. 19, 1977

[30] Foreign Application Priority Data

Nov. 16, 1976 [JP] Japan ............................... 51-137542

[51] Int. Cl.2 ........................ G04B 47/00; G06F 15/02

[52] U.S. Cl. .................................... 364/705; 58/50 R; 58/152 R; 364/710

[58] Field of Search ............... 364/705, 710; 58/50 R, 58/152 R

[56] References Cited

U.S. PATENT DOCUMENTS

| | | | |
|---|---|---|---|
| 3,813,533 | 5/1974 | Cone et al. .................... | 58/152 R X |
| 3,816,730 | 6/1974 | Yamamoto et al. ................. | 364/705 |
| 4,022,014 | 5/1977 | Lowdenslager ................. | 364/705 X |
| 4,035,627 | 7/1977 | Dickinson et al. .............. | 364/709 X |

*Primary Examiner*—Jerry Smith
*Attorney, Agent, or Firm*—Fitzpatrick, Cella, Harper & Scinto

[57] ABSTRACT

In an electronic instrument having a keyboard including numeric keys for entering numerical data into the instrument and instruction keys for entering instructions into the instrument, there is provided a memory responsive to the operation of the numeric keys to store numerical data therein, an arithmetic operating circuit responsive to the operation of the instruction keys to operate on at least the numerical data, a time counter for counting time, and a setter for setting the initial value in the time counter in accordance with the numerical data entered by operation of the numeric keys.

10 Claims, 6 Drawing Figures

ELECTRONIC INSTRUMENT

BACKGROUND OF THE INVENTION

1. Field of the Invention

This invention relates to an electronic instrument dealing with a plurality of different systems of notation (or units).

2. Description of the Prior Art

There are commercially available electronic instruments capable of dealing with different systems of notation, such as electronic devices comprising a combination of a timepiece and a desk top calculator or electronic devices comprising a combination of a stop watch and a desk top calculator. However, these do not enable one to confirm time of day or measure time while effecting calculation. This is because they have only one display means and do not enable calculation and time of day or calculation and time to be seen at a time.

Also, such electronic instruments as those mentioned above have individual elements for dealing with respective systems of notation and rarely have a common element capable of dealing with different systems of notation.

SUMMARY OF THE INVENTION

In view of the above-noted points, it is an object of the present invention to provide an improved electronic instrument.

It is another object of the present invention to provide an electronic instrument which enables the initially set numerical data of a timepiece unit to be entered from the key input portion of a calculator unit having a key input portion.

It is still another object of the present invention to provide an electronic instrument having a data display portion concerned with operation of the calculator unit and a time-of-day display portion initially settable by the key input portion of the calculator unit.

It is yet still another object of the present invention to provide an electronic instrument having a first display portion for displaying a first system of notation and a second display portion for displaying a second system of notation.

Other objects of the present invention will become fully apparent from the detailed description of the invention taken in conjunction with the accompanying drawings.

DESCRIPTION OF THE PREFERRED EMBODIMENTS

Figure 1:
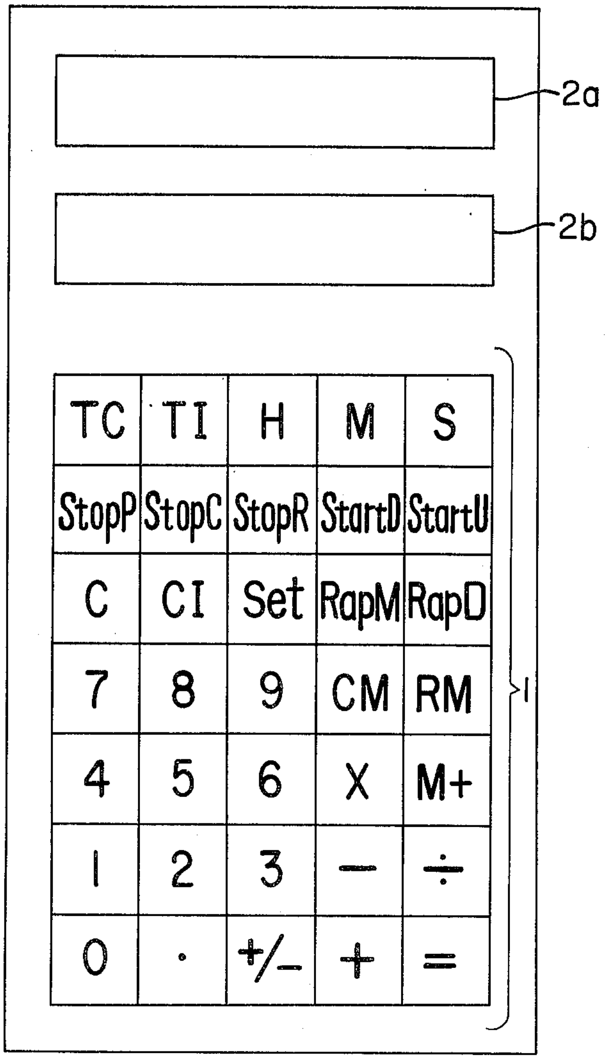
FIG. 1 is a pictorial view showing an embodiment of the electronic device according to the present invention.

Referring to FIG. 1 which is a pictorial view of the calculator as an example of the electronic device according to the present invention, a keyboard 1 includes a plurality of keys. Respective keys are used to designate various instructions such as numerical inputs, operating instructions, timing control instructions, etc. Operations of these keys will be briefly described below.

0, 1, 2, . . . , 9 numerical input keys

+/− key for converting the sign of numeral displayed

+, −, ×, ÷ arithmetic operations preset/operation executing keys

= operation executing key

M+ addition executing key for executing the addition of displayed data to the memory RM memory call key CM memory data erase key CI displayed data (main displayed data) erase key C erase key for clearing the content of the register concerned with operations TC erase key for clearing the content of the register concerned with time TI key for converting decimal data into time count data S second numerical input designating key M minute numerical input designating key H hour numerical input designating key Start U time count start key (up count)

Start D time count start key (down count)

Stop R time count interruption key (counter reset key)

Stop C time count stop key (continue count)

Stop P time count temporary stop

Rap D transfer instructing key for transferring time count data to the operational register Rap M transfer instructing key for transferring time count data to the memory register Set transfer instructing key for transferring the operational register data to the time count register (initial value set key)

Designated by *2a* and *2b* are display means responsive to operations of the above-described keys to display numerical data, and each of them comprises a plurality of juxtaposed segment type display elements.

Figures 2, 2B:
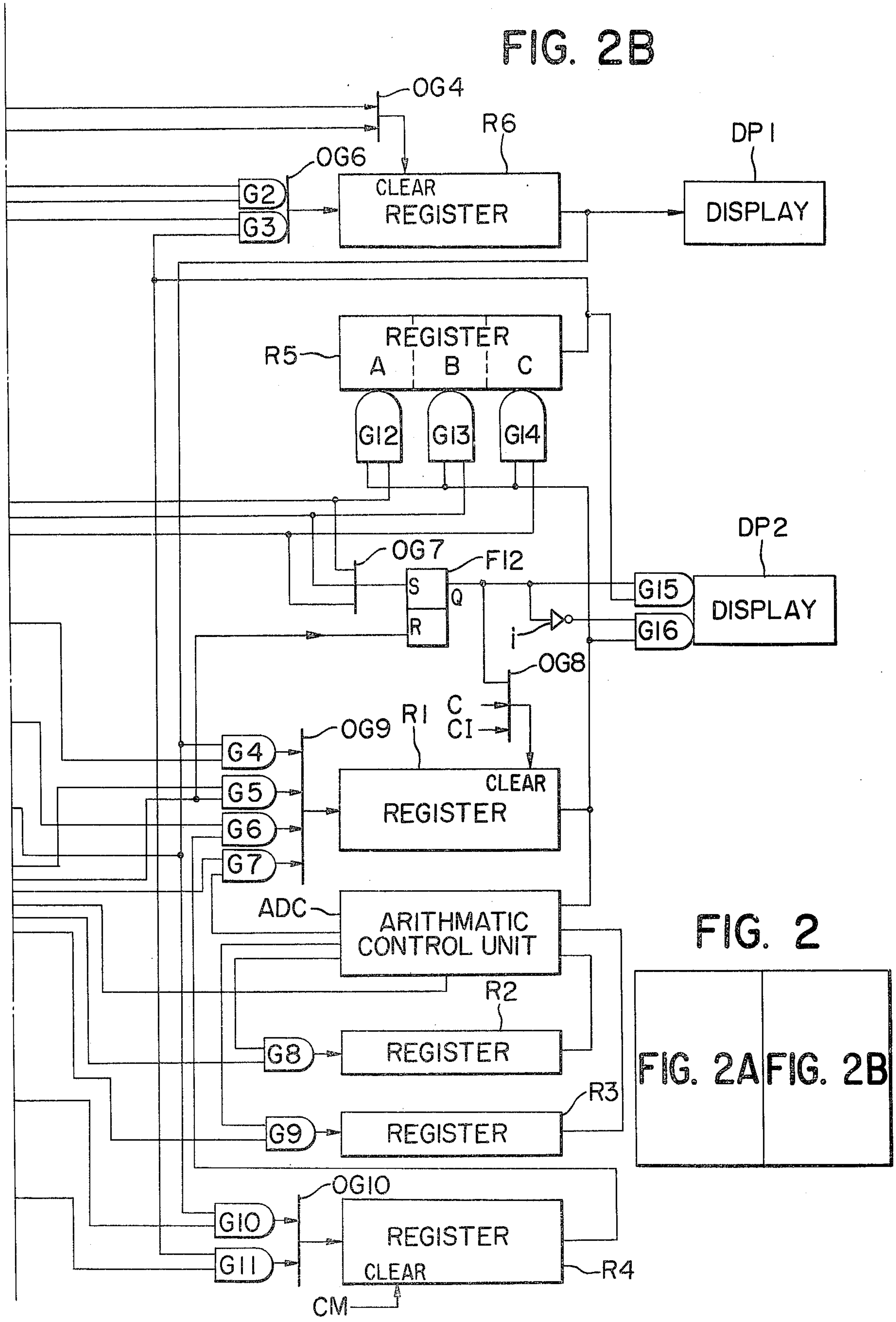
FIG. 2 is a block diagram of the embodiment shown in FIG. 1.
Figure 2A:
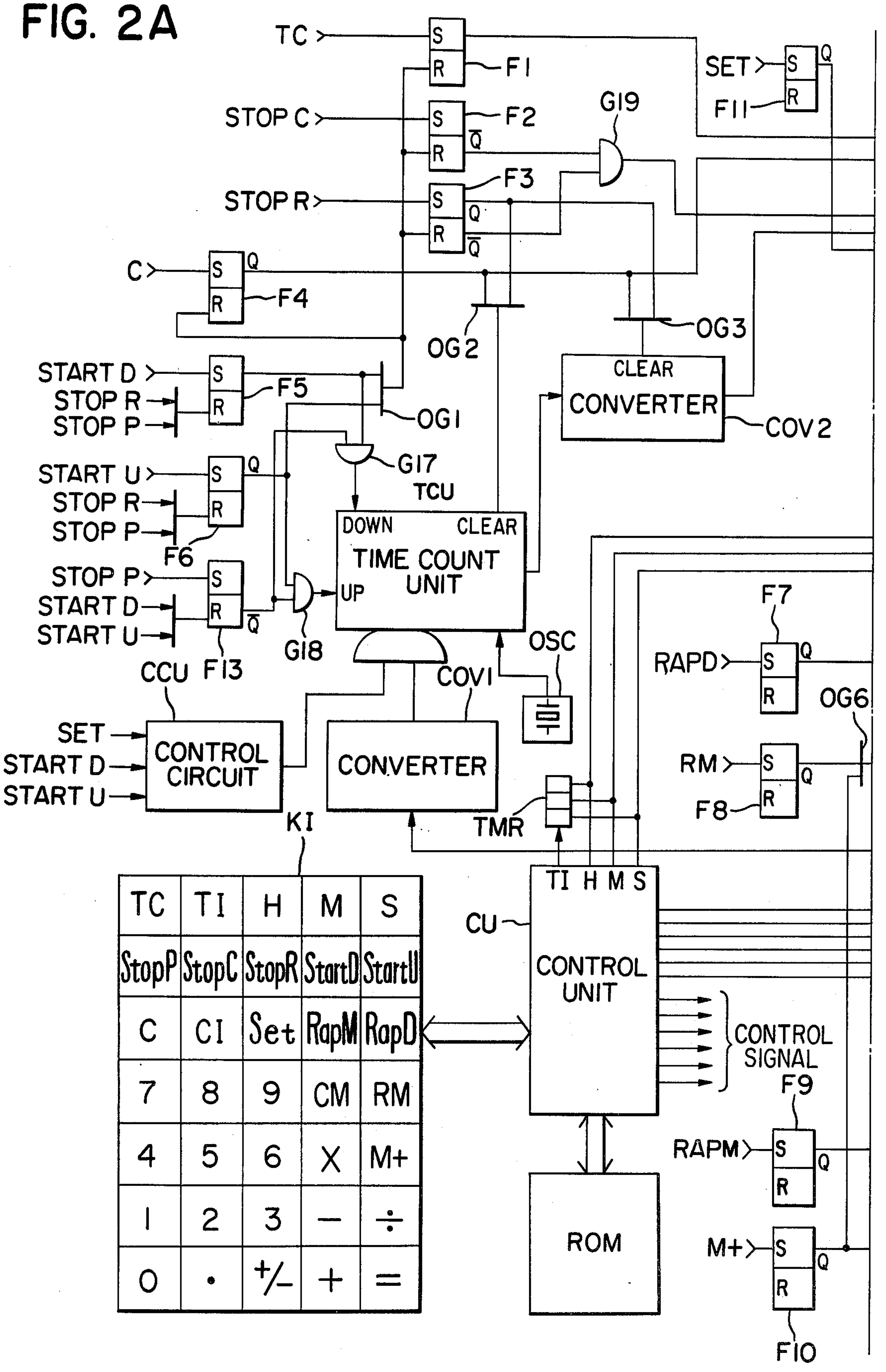

Referring now to FIG. 2 which is a block diagram of the calculator shown in FIG. 1, a keyboard input unit KI generates coded signals corresponding to the keys. Designated by CU is a control unit for receiving signals from the keyboard input unit KI or signals from other circuits and for generating various control and data signals to be applied to circuits which will hereinafter be described. ROM is a memory which stores input sequence, data and operation control sequence. R1 is a register which receives data from the keyboard input unit KI at first. Registers R2 and R3 are used with the register R1 to store therein data during arithmetic operations. Register R4 is one which is commonly called an independent memory. Register R5 receives as input the data of hour, minute and second. Register 6 also receives as input the data of hour, minute and second. Designated by ADC is an arithmetic control unit which causes the contents of the registers R1, R2, R3 to be calculated under the instruction from the control unit CU. COV1 is a converter circuit for converting the data of the register R6 into the unit of second or for converting the serial data of the register R6 into parallel data. Designated by TCU is a time count circuit for counting the pulses of clock OSC.

When the converter circuit COV1 effects conversion of serial data into parallel data, two sexagesimal counters and one quatrevigesimal counter are series-connected together in the counter unit and such unit counts the pulses of the aforementioned clock.

Designated by COV2 is a converter circuit for converting the data of the time count circuit TCU into a form of display. When the time count circuit TCU comprises two sexagesimal counters and one quatrevigesimal counter, the converter circuit COV2 performs parallel-to-serial conversion. Display units DP1 and DP2 are provided with the display means 2a and 2b as shown in FIG. 1.

Control circuit CCU controls the delivery of the content of the converter circuit COV1 to the time count circuit TCU. Timer TMR receives a signal responsive to the key TI and generates a scanning signal.

Flip-flops F1–F13 are set and reset by the signal from the control unit CU. There are further seen AND gates G1–G19, OR gates OG1–OG10 and inverter i.

Operation of the present embodiment constructed as described will now be discussed. The case of measuring the calculating speed of the operator is taken as an example.

First, keys "C", "CM" and "TC" are operated to clear the calculator.

Next, the following key operations are effected to enter 12 hours 45 minutes and 30 seconds as the count starting time.

Keys "1" and "2" are first operated, whereby signals corresponding to these keys are generated from the keyboard input unit KI and discriminated by the control unit CU. As the result, data corresponding to the keys "1" and "2" are applied to the register R1 through the AND gate G5, and the data so applied are displayed on the display unit DP2 through the AND gate G16.

Figure 3:
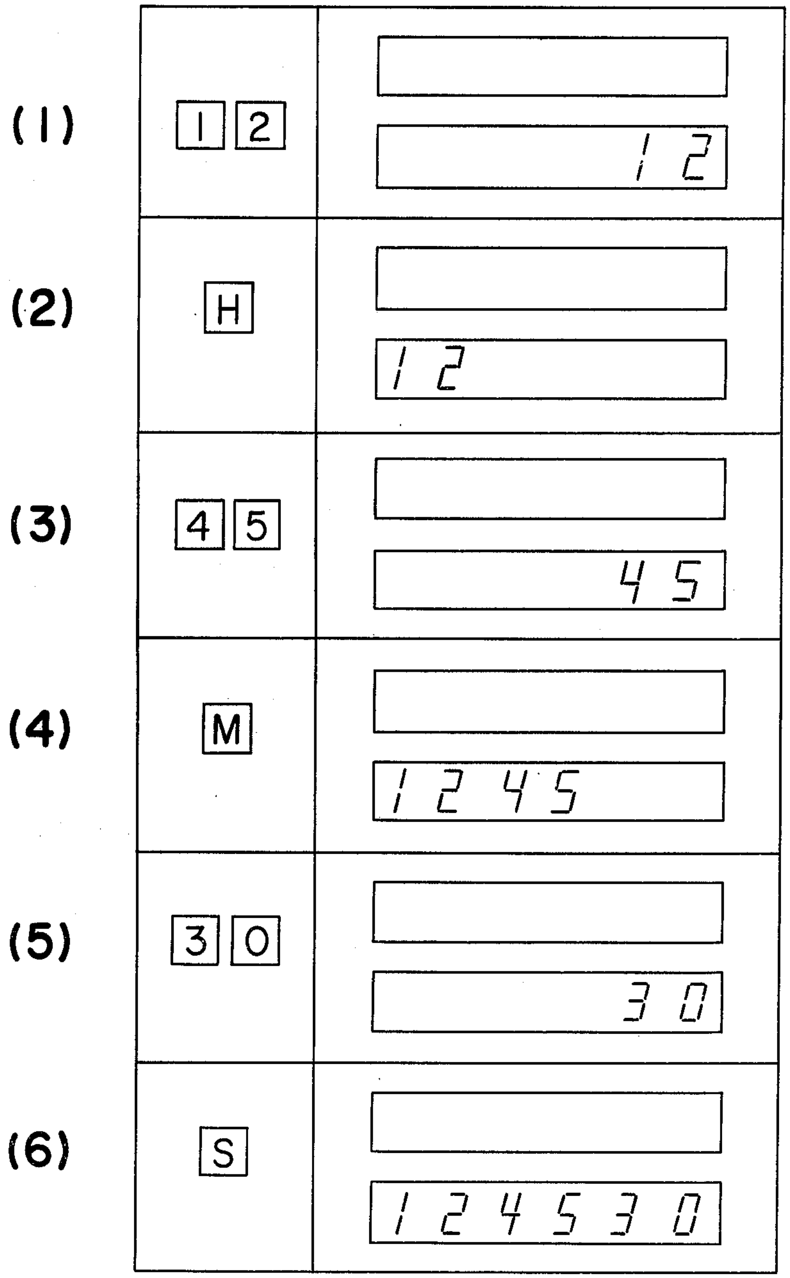
FIG. 3 is a view illustrating the operation of the same embodiment.
Figure 3:
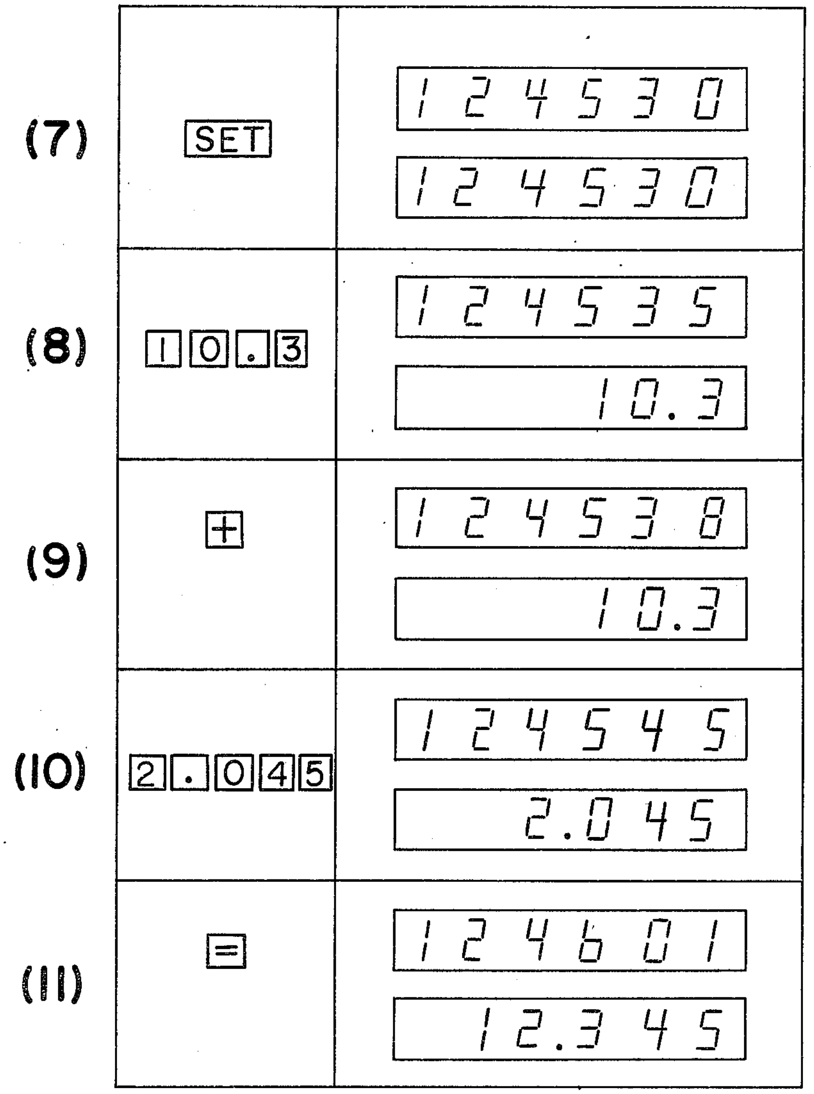

Subsequently, the hour numerical input key "H" is operated, whereby a signal is put out from the terminal H of the control unit CU and the data "12" of the register R1 is stored into the section A of the register R5 through the AND gate G12. Also, the Q output of the flip-flop F12 is set to 1 and the content of the register R5 is displayed on the display unit DP2 through the gate G15, in the manner as shown in FIG. 3(2).

Next, when keys "4" and "5" are operated, the control unit CU responds to the operation of these numeric keys to generate to a signal for rendering the Q output of the flip-flop F12 to "0", and this Q signal clears the content of the register R1. After the aforementioned control, the data corresponding to keys "4" and "5" are applied to the register R1 and displayed on the display unit DP2 through the AND gate G16, in the manner as shown in FIG. 3(3).

The minute numerical input key "M" is operated, whereby the data "45" of the register R1 is caused by the signal from the control unit CU to enter the section B of the register R5 through the AND gate G13. The signal from the control unit CU also renders the Q output of the flip-flop F12 to "1", and causes the content 124500 of the register R5 to be delivered to the display unit DP2 through the AND gate G15.

If keys "3" and "0" are then operated, a similar operation to that described above takes place and upon operation of the second numerical input key "S", the data "30" of the register R1 is applied to the section C of the register R5 through the AND gate G14 and display of 124530 takes place on the display unit DP2.

When the key "SET" is operated, the Q output of the flip-flop F11 becomes "1". Accordingly, the content of the register R5 enters the register R6 through the AND gate G3 and is displayed on the display unit DP1. At the same time, the content of the register R6 enters the converter circuit COV1 and passes therethrough to be set by the time count unit TCU. The content so set is passed through the converter circuit COV2 and the AND gate G2 to the register R6, and displayed on the display unit DP1.

When the operator operates the key "START U", the time count unit TCU starts counting the output signals of clock OSC with the preset 124530 as the initial value, and the contents of the time count unit TCU are successively passed through the converter circuit COV2 and the AND gate G2 to the register R6 and the display unit DP1, whereby lapse of time is displayed from moment to moment.

If, during the above-described operation, the operator carries out a calculation such as, for example, 10.3+2.045=, then the following process will take place.

Upon operation of numeric keys "1", "0", "." and "3", the Q output of the flip-flop F12 is rendered to "0" and the content of the register R1 is displayed on the display unit DP2, while the data stored in the register R1 before the key operation is cleared and data "10.3" comes to be stored in the register R1.

When the key "+" is operated, the data in the register R1 is transferred through the gate G8 to the register R2.

Next, when numeric keys "2", ".", "0", "4" and "5" are operated, the content of the register is cleared by the first of these numerals and the data "2.045" is applied to the register R1.

The operation executing key "=" is depressed, whereby the contents of the register R1 and R2 are added together in accordance with the add instruction, and the result of the addition is stored in the register R1 and displayed on the display unit DP2. If the display means 2a is then diplaying 124601, it can be seen that the time is 12 o'clock 46 minutes 1 second. When the key "STOP C" is depressed, the $\overline{Q}$ output of the flip-flop F2 is rendered to 0 and the AND gate G2 is closed, so that the time being displayed remains unchanged.

The key "STOP R" is depressed, whereupon the Q output of the flip-flop F3 becomes "1" and the time count unit TCU and the converter circuit COV2 are both cleared while the AND gate G2 is closed by the $\overline{Q}$ output of the flip-flop F3, so that the point of time whereat the key operation has taken place is displayed.

When the key "STOP P" is depressed, the $\overline{Q}$ output of the flip-flop F13 becomes "0" and the Q output of the flip-flops F5 and F6 are interrupted by the gates G17 and G18, so that the time count unit TCU stops counting.

The key "START D" serves to cause the time count unit TCU to count down.

The above-mentioned keys will further be described. Upon operation of the key "START D", the flip-flop F5 is set and the $\overline{Q}$ output thereof is applied to one end of the AND gate G17, while the Q output of the flip-flop F13 becomes "1", whereby a signal meaning count down is applied to the count down terminal "down" of the time count unit TCU. Upon application of such down signal, the time count unit TCU starts counting down from a set value, so that the display means 2a displays the count down as it goes on.

Key "Rap D" serves to render the Q output of the flip-flop F7 to "1" and to apply the time data of the register R6 to the register R1.

This key will further be described. Upon depression of the key "Rap D", the flip-flop F7 is set by the signal from the control unit CU and the content of the register R6 is stored into the register R1 through the AND gate G4 and the OR gate OG9, and such content is displayed on the display means 2*b* through the AND gate G16.

Key "RM" serves to render the Q output of the flip-flop F8 to "1" and to apply the content of the register R4 to the register R1.

Key "Rap M" serves to render the Q output of the flip-flop F9 to "1" and apply the content of the register R6 to the register R4 for preservation therein.

Key "M+" serves to render the Q output of the flip-flop F10 to "1", to transfer the content of the register R1 to the register R2, to transfer the content of the register R4 to the register R1, to sum the contents of the registers R1 and R2 and cause the register R4 to store the sum.

Key "TI" serves to deliver the data stored in the register R1 to the register R5. Upon operation of this key, the control unit drives the timer TMR so that three output lines thereof put out scanning signals with predetermined time intervals therebetween, thus distributing the data of the register R1 into the sections A, B and C of the register R5 in accordance with the scanning signals.

What we claim is:

1. An electronic instrument comprising:

a keyboard having numeric keys for entering numerical data into the instrument, instruction keys for instructing arithmetic operations, and a time sampling key;

clock means for outputting time information in digital format;

a first storage means for storing numerical data;

a second storage means for storing numerical data;

first control means for causing said first storage means to store numerical data entered in accordance with the operation of said numeric keys;

second control means responsive to the operation of said time sampling key for causing said second storage means to store a sampled digital time information from said clock means;

arithmetic operation means for carrying out arithmetic operations; and third control means responsive to operation of one of said instruction keys for causing said arithmetic operation means to carry out an operation between the numerical data stored in said first and second storage means in accordance with the instruction from the operated instruction key, and for causing said second storage means to store the result.

2. An electronic instrument according to claim 1 further comprising:

first display means for visualizing the content of said second storage means; and second display means for visualizing the digital time information from said clock means.

3. An electronic instrument according to claim 2 further comprising input control means responsive to the operation of said numeric keys for causing said second storage means to store the numerical data in accordance with the input sequence.

4. An electronic instrument according to claim 3 wherein said keyboard includes time unit keys for specifying time units, such as hour, minute and second, to the numerical data entered into the instrument, and said instrument further comprises fourth control means responsive to the operation of said time unit keys for rearranging the sequence of the numerical data arranged under the control of said input control means in accordance with a time basis sequence.

5. An electronic instrument according to claim 4 further comprising setting means for setting the numerical data rearranged under the control of said fourth control means to said clock means.

6. An electronic instrument according to claim 4 wherein said second display visualizes the numerical data rearranged under the control of said fourth control means.

7. An electronic instrument according to claim 1 wherein said keyboard includes a further key and said instrument further comprises means responsive to the operation of said further key for resetting said clock means in accordance with the numerical data stored in said second storage means.

8. An electronic instrument comprising:

first display means for numerical information;

second display means for numerical information;

clock means for outputting time information in digital format;

a manually operable key;

storage means for storing numerical data;

first control means for causing said first display means to sequentially visualize the digital time information from said clock means; and second control means responsive to the operation of said key for causing said storage means to store a sampled digital time information from said clock means, and for causing said second display means to visualize the sampled digital time information stored in said storage means.

9. An electronic instrument according to claim 8 further comprisng an arithmetic operation means for carrying out an arithmetic operation, additional storage means for storing numerical data, and arithmetic control means for causing said arithmetic operation means to carry out an operation with the numercial data stored in both of said storage means, and for causing said additional storage means to store the result.

10. An electronic instrument according to claim 9 further comprising third control means for transferring the numerical data in said additional storage means to said storage means, and for causing said second display means to visualize the numerical data stored in said storage means.

* * * * *